United States Patent [19]

Everest

[11] 4,078,179

[45] Mar. 7, 1978

[54] MOVABLE INSTRUMENT WITH LIGHT EMITTING POSITION INDICATOR

[75] Inventor: Charles Eugene Everest, Santa Ana, Calif.

[73] Assignee: Telatemp Corporation, Fullerton, Calif.

[21] Appl. No.: 710,124

[22] Filed: Jul. 30, 1976

[51] Int. Cl.² ............................................. G01J 5/00
[52] U.S. Cl. .................... 250/338; 250/340; 250/342
[58] Field of Search ............ 250/330, 332, 334, 338, 250/340, 341, 342

[56] References Cited

U.S. PATENT DOCUMENTS

| | | | |
|---|---|---|---|
| 3,283,148 | 11/1966 | Schwarz et al. | 250/330 X |
| 3,502,874 | 3/1970 | Astheimer | 250/330 X |
| 3,585,394 | 6/1971 | Higby et al. | 250/330 X |
| 3,761,713 | 9/1973 | Merrill | 250/341 |

*Primary Examiner*—Archie R. Borchelt
*Attorney, Agent, or Firm*—Edward D. O'Brian

[57] ABSTRACT

A movable instrument intended for utilization in detecting a difference which is capable of being optically detected between adjacent locations can be constructed so as to include an optical sensor for producing an output which is proportional to the difference between various locations and an illumination source operatively connected to the optical sensor for providing a level of brightness which is proportional to the output of the optical sensor. Such an instrument is preferably a device which is used in determining the temperature of a surface. When the invention is utilized in conjunction with such an instrument the apparent intensity of the light emitted from the illumination source provides a convenient analog indicator facilitating the instrument being pointed at either the hottest or coldest portion of the surface.

7 Claims, 3 Drawing Figures

MOVABLE INSTRUMENT WITH LIGHT EMITTING POSITION INDICATOR

BACKGROUND OF THE INVENTION

The invention set forth in this specification pertains to new and improved movable instruments which are provided with light emitting position indicators.

Although such instruments can be constructed so as to be utilized for a variety of different purposes it is preferred to utilize the present invention in connection with instruments employed in determining the temperature at a specific area of a surface. Hand-held movable instruments for use in measuring the temperature at various areas on a surface are considered to be well known. Normally in utilizing such instruments it is desired to obtain a temperature reading indicating the temperature at either the hottest or the coldest spot on such a surface. In order to direct or point the instrument toward such a spot it is necessary to monitor the temperature at various different adjacent locations on the surface until the instrument is held so that the sensor used in the instrument is pointed at either the hottest or the coldest spot on such a surface. In effect this operation involves detecting the differences in the temperature between adjacent locations or areas on the surface as the instrument is used.

Such instruments can of course be constructed in a number of different ways. They can be constructed so as to utilize a D'Arsonval meter movement in order to provide an analog indication of the difference in the temperature of adjacent areas of a surface and in order to provide a direct readout as to the temperature at any specific area. The use of such meters is considered undesirable and disadvantageous because D'Arsonval movements tend to be relatively expensive, because such movements normally are capable of being easily damaged, and because it is frequently difficult to read such a meter with a desired degree of accuracy. As a result of these factors instruments of the type described normally are now constructed so as to utilize a digital readout instead of a D'Arsonval meter movement.

In many ways this is considered to be highly advantageous. Such digital readouts are relatively inexpensive. They are not as prone to physical damage as D'Arsonval meter movements. Further, they are capable of being accurately read with a minimum of difficulty. However, they are less desirable than D'Arsonval meters in one regard. The response time of such a digital readout as an instrument as noted is used is relatively slow.

This makes it comparatively difficult for a movable instrument such as one used to obtain temperature readings to be directed at either the hottest or coldest spot or area on a surface with a minimum amount of time. Although it would be possible to utilize a D'Arsonval meter movement in conjunction with a digital readout so as to facilitate directing a hand-held movable instrument in a desired manner this is disadvantageous because of the cost of a D'Arsonval movement, because of the fact that such movement may be damaged relatively easily, and because of the slow response time of such a movement.

SUMMARY OF THE INVENTION

It is considered that it will be apparent from the preceding that there is a need for new and improved movable instruments which provide an effective analog indication of a difference in a value capable of being optically detected between various different adjacent locations. A broad objective of the present invention is to fulfill this need. Further objectives of the invention are to provide movable instruments such as devices for optically measuring temperatures with light emitting position indicators providing an analog indication of changes in temperature as such an instrument is moved between adjacent locations. Other objectives of the invention are to provide instruments as described which can be easily and conveniently constructed at a comparatively nominal cost, which are relatively immune from physical damage and which are capable of providing prolonged, reliable performance.

In accordance with this invention these objectives are achieved by providing in a movable instrument which can be utilized so as to detect a difference capable of being optically detected between various adjacent locations which differ from one another, said instrument including an optical sensing means for producing an output which is proportional to said difference between said locations and which is adapted to be pointed generally toward a specific location during the use of said instrument, the improvement which comprises: illumination means operatively connected to the optical sensing means for providing a level of brightness which is proportional to the output of the optical sensing means.

In the preferred utilization of the invention such a movable instrument is a hand-held instrument for use in optically determining temperature at various different points of a surface. Such instruments are known and conventionally utilize various known type of optical sensors. As such instruments are used they are normally moved with respect to a surface until the hottest or coldest spot on such surface is detected and then are held so as to be directed toward such spot until the temperature of such spot is measured or detected.

BRIEF DESCRIPTION OF THE DRAWING

The invention is of such a character that it is considered that it is best more fully explained with reference to the accompanying drawing in which.

Figure 1:
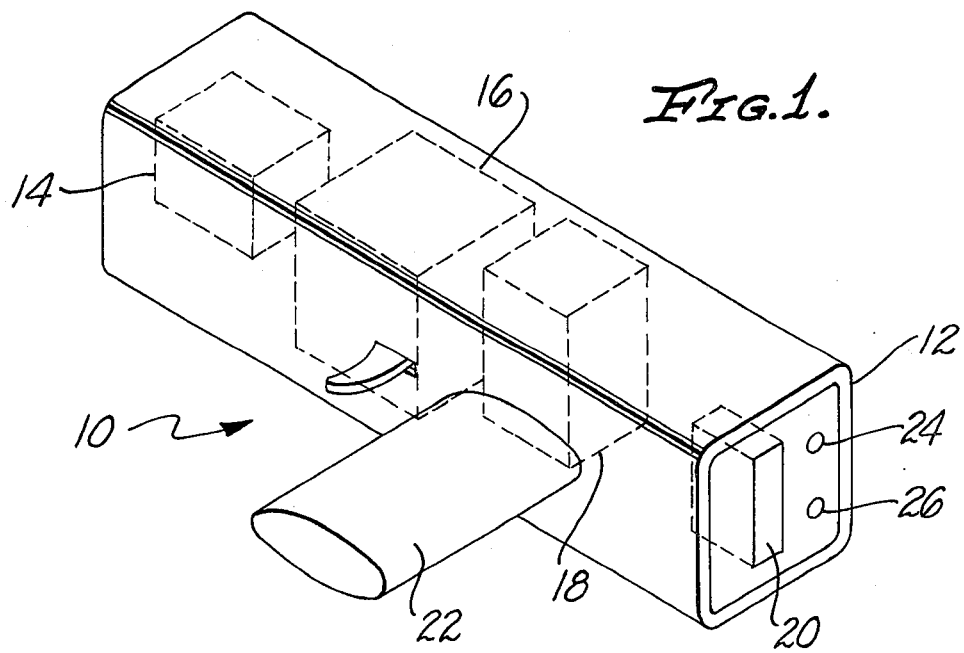
FIG. 1 is an isometric view of a hand-held optical pyrometer constructed so as to utilize the present invention.

Although the principles and concepts of the present invention are utilized in structures as are indicated in the drawing they are of such a character that they may be also utilized in other different manners. These principles or concepts are set forth and defined in the appended claims. It is considered that they can be utilized in many different manners than indicated in this specification through the use or exercise of routine engineering skill.

DETAILED DESCRIPTION

The invention set forth herein can be easily utilized with an instrument such as the temperature sensing gun 10 indicated in FIG. 1. This gun 10 has a generally barrel-like housing 12 which supports a thermopile detector 14 in such a manner that this detector 14 is directed generally in the direction of the housing 12 so as to be capable of being used in determining the temperature of a specific surface area (not shown) generally in front of the gun 10.

The housing 12 also contains a conventional battery 16, an electronic "package" 18 connected to the battery 16 and the detector 14, and a digital readout 20 connected to the "package" 18 located at the end of the housing 12 remote from the detector 14. A handle 22 is provided on the housing 12 so that the gun 10 may be held in the hand and moved during its utilization. It will be recognized that all of the parts of the gun 10 indicated in the preceding have not been described in detail in this specification. This is because such parts are presently known and are utilized in commercial "guns" for making temperature measurements.

The invention is utilized in the gun 10 by employing a light emitting diode 24 and, if desired, a second light emitting diode 26 on the housing 12 adjacent to the digital readout 20 where the illumination emitted from these diodes can be easily observed as the gun 10 is used. In accordance with this invention these diodes 24 and 26 are used as illumination sources with the diode 24 being utilized as to indicate when the gun 10 is pointed so that the detector 14 is directed to the hottest spot on a surface or in an area and with the diode 26 being utilized so as to indicate when the gun 10 is pointed at the coldest spot on a surface or in an area. As hereinafter indicated these diodes 24 and 26 are utilized so that the apparent brightness or luminous intensity of the diode 24 is greatest as it is directed to such a hottest spot and so that the apparent brightness or luminous intensity of the diode 26 is greatest when the gun 10 is pointed at such a coldest spot.

Figure 2:
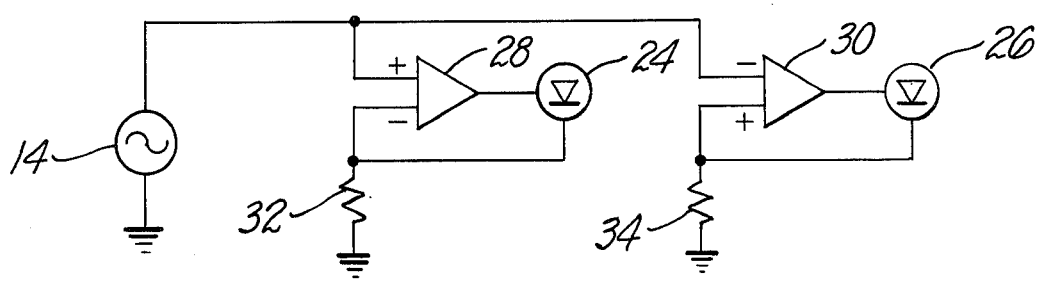
FIG. 2 is a circuit diagram showing a circuit which may be employed in order to utilize the invention in the instrument illustrated in FIG. 1.

One simple circuit which may be utilized so as to accomplish this type of result is indicated in FIG. 2 of the drawing. In this circuit the output from the detector 14 is fed to the non-inverting input of an operational amplifier 28 and is concurrently fed to the inverting input of a second corresponding operational amplifier 30. The output of the operational amplifier 28 is supplied through the diode 24 in a feedback loop back to the inverting input of the amplifier 28 and this inverting input is grounded through a resistor 32. Similarly the output of the operational amplifier 30 is fed through the diode 26 in a feedback loop to the non-inverting input of the operational amplifier 30. The non-inverting input of the amplifier 30 is also grounded through another resistor 34.

It is believed that the operation of this circuit shown in FIG. 2 will be essentially self-evident from an examination of the circuit. In use each of the amplifiers 28 and 30 will always force enough signal back through the feedback loops or circuits shown to maintain a zero voltage difference between their respective inputs which are connected to the detector 14 and their inputs which are connected to the feedback loop. The input to both of these amplifiers 28 and 30 from the detector 14 will always be followed by the feedback to these amplifiers 28 and 30 through the feedback loops illustrated. As a consequence of this the current supplied to the diodes 24 and 26 will be proportional to the voltage of the signal supplied by the detector 14. In the case of the diode 24 the current through this particular diode 24 will increase in accordance with the increase in the signal from the detector 14 while the signal through the diode 26 will decrease in accordance with increases with the signal supplied by the detector 14.

The use of diodes in this manner results in the diode 24 reaching its maximum apparent luminous intensity as observed by the eye of the user when the gun 10 is pointed so that the detector 14 is directed toward an area which is hotter than adjacent areas. Also, the use of diodes in this manner results in the diode 26 having its highest apparent luminous intensity as observed by the eye of the user when the gun 10 is directed so that the detector 14 is pointed toward an area or region which is colder than other adjacent areas or regions. This is highly desirable during the use of the gun 10.

Normally as this gun is utilized it is desired to obtain a temperature reading through the use of the readout 20 which corresponds to either the highest or lowest temperature in a specific area or region, such as, for example, along a surface, within a kiln or the like. As the gun 10 is moved with respect to an area or region the apparent light intensity of the diodes 24 and 26 will vary in an analog manner as to rapidly and conveniently facilitate the gun 10 being directed toward either such a hottest or coldest region in an area. Because the response time of the readout 20 normally employed is relatively slow this will speed up the utilization of the gun 10 for its desired purpose.

The use of diodes 24 and 26 as illumination sources with the present invention is considered to be particularly desirable. The apparent luminous intensity of a diode is linearly proportional to the applied current within a comparatively limited range of applied voltage capable of being provided by the detector 14. In many applications of the invention it may be desirable to "clean up" the voltage signal provided by the detector 14 in conventional manners so as to remove what may be referred to as "artifacts" from the signal. In many applications it may also be desirable to amplify the signal from the detector 14 before applying it to the operational amplifiers 28 and 30. At times economies of manufacture may be achieved by utilizing a signal from a part of what has been referred to in the preceding as the electronic "package" 18 to drive the amplifiers 28 and 30. Such expedients are considered to be within routine engineering skill. Because other light sources than light emitting diodes do not normally have a luminous intensity which is linearly proportional to applied current or voltage it is considered preferable to use light emitting diodes with the invention. However, through the use of feedback from a phototransistor to an operational amplifier supplying current to other than a light emitting diode it is possible to operate such another light source so that its luminous intensity is linearly proportional to an applied voltage or current signal. In the circuit shown in FIG. 2 the brightness of the diodes 24 and 26 changes linearly in response to the full analog variation of the signal supplied by the detector 14.

Because the response—i.e., the apparent luminous intensity—of a light emitting diode is linear within only a limited range it may be necessary on occasion to utilize the diodes 24 and 26 so that these diodes increase from zero or no illumination to full brightness over a comparatively small percentage of the full scale of the electric signal supplied by a detector such as the detector 14. In the case of guns such as the gun 10 used to measure temperature the necessity for this will be dependent upon the parameters of the detector used as well as upon the intended utilization of the gun—i.e., the temperature range intended for use with the gun.

Figure 3:
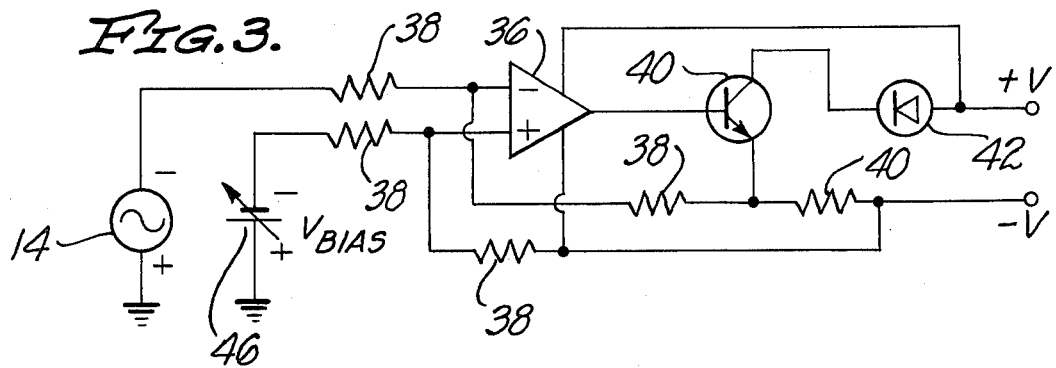
FIG. 3 is a circuit diagram showing an alternate or modified circuit which may be employed in order to utilize the invention in an instrument as illustrated in FIG. 1.

In FIG. 3 of the drawing there is shown a circuit in which a diode 42 changes from not emitting light to full scale brightness over a comparatively small percentage of the possible variation in the electrical signal of the detector 14. In the circuit shown in FIG. 2 an operational amplifier 36 corresponding to the amplifier 28 described in the preceding is utilized with four feedback resistors 38 in what can be referred to as a classical unity-gain, inverting, differential feedback amplifier. The output from the operational amplifier 36 is connected to the base of a transistor 40 so as to govern the operation of this transistor 40 in such a manner as to control the current through a light emitting diode 42 corresponding to the diode 24 in accordance with the variation in the voltage from the detector 14 serving as a signal source.

This circuit in FIG. 3 includes a conventional control resistor 44. The amplifier 36 is used to force the voltage across this resistor 44 to be equal to the input voltage from the detector 14 by forcing the transistor 40 to pass enough current through the resistor 44 to accomplish this objective. With this structure there can be current in the collector of the transistor 40 only if the base of the transistor 40 is driven by the amplifier 36 so as to be positive with respect to the base of the transistor 40. A biasing voltage source 46 is connected to the non-inverting input of the amplifier 36 as shown.

The circuit indicated in FIG. 3 in effect employs the diode 42 as a differential signal indicator so that this diode 42 can be illuminated over a specific range corresponding to a part of the range of the input voltage capable of being supplied by the detector 14. If desired, the circuit indicated in FIG. 3 may be modified so as to duplicate all parts of this circuit except the detector 14 in order to provide light emitting diodes capable of indicating both maximum and minimum or hottest and coldest temperature. In the event of such modification the operational amplifier in the duplicated circuit part of the complete circuit should be connected in the reverse mode of the operational amplifier in the original part of the circuit in a manner as indicated in FIG. 3.

The present invention is considered quite advantageous inasmuch as it uses a level of apparent illumination as an analog indication. It is considered that it is much simpler for a human being to detect the level of illumination than to read a meter such as a D'Arsonval type meter. Structures coming within the scope of this invention are relatively resistant to damage and are comparatively inexpensive. They are considered desirable adjuncts to various types of instruments in enabling such instruments to be used so as to be pointed in a desired manner in a minimum amount of time.

I claim:

1. A movable instrument which can be utilized so as to detect a difference between various adjacent locations which differ from one another in a manner capable of being optically detected, said instrument including an optical sensing means for producing an output which is proportional to said difference between said locations in which the improvement comprises:

light emitting diode illumination means operatively connected to said optical sensing means for providing a level of brightness which is proportional to the output of said optical sensing means, said illumination means being located so as to be capable of being visually inspected as said instrument is used.

2. An instrument as claimed in claim 1 including:

operational amplifier means connected between said optical sensing means and said illumination means for providing a signal to said illumination means which is proportional to the signal supplied by said optical sensing means.

3. An instrument as claimed in claim 1 wherein:

said optical sensing means is a thermopile capable of providing a voltage signal, and including amplifier means for converting said voltage signal to a current signal which is proportional to said voltage signal connected to said thermopile and to said light emitting diode.

4. An instrument as claimed in claim 1 wherein:

there are two of said light emitting diode illumination means, and including control means connected to said optical sensing means and operatively connected to each of said light emitting diode illumination means for operating both of said illumination means so that one of said illumination means indicates a maximum value of the signal from said optical sensing means and the other of said illumination means indicates a minimum value signal from said optical sensing means.

5. An instrument as claimed in claim 1 wherein:

there are two of said light emitting diode illumination means, said optical sensing means is a thermopile capable of providing a voltage signal and including two separate amplifier means, each of said amplifier means being connected to said thermopile, each of said amplifier means being connected to one of said light emitting diode illumination means, one of said amplifier means serving to provide a current signal to the light emitting diode illumination means connected thereto which increases with the voltage signal of said thermopile.

the other of said amplifier means serving to provide a current signal to the light emitting diode illumination means connected thereto which decreases with the voltage signal of said thermopile.

6. An instrument as claimed in claim 5 wherein:

both of said amplifier means are operational amplifier means.

7. An instrument as claimed in claim 6 wherein:

both of said operational amplifier means are operative to provide a current signal over the full range of the voltage signal capable of being provided by said thermopile.

* * * * *